United States Patent [19]
Beaulicu

[11] Patent Number: 6,082,247
[45] Date of Patent: Jul. 4, 2000

[54] APPARATUS FOR CONSECUTIVELY DISPENSING AN EQUAL VOLUME OF LIQUID

[75] Inventor: Roderick H. Beaulicu, Cumberland, R.I.

[73] Assignee: Keurig, Inc., Wakefield, Mass.

[21] Appl. No.: 09/233,272

[22] Filed: Jan. 19, 1999

[51] Int. Cl.[7] .............................. A47J 31/32; B67D 5/62
[52] U.S. Cl. ........................... 99/302 R; 99/283; 99/305; 222/146.5; 222/394
[58] Field of Search ......................... 99/283, 282, 302 R, 99/305; 222/394, 405, 146.5, 438; 137/206, 209

[56] References Cited

U.S. PATENT DOCUMENTS

| | | | |
|---|---|---|---|
| 3,364,842 | 1/1968 | Valente | 99/302 R |
| 3,381,604 | 5/1968 | Bixby, Jr. | 99/283 |
| 3,478,670 | 11/1969 | Fuqua . | |
| 3,518,933 | 7/1970 | Weber | 99/302 R |
| 4,143,589 | 3/1979 | Weber | 99/302 R X |
| 4,644,855 | 2/1987 | Woolman et al. | 99/280 |
| 4,823,685 | 4/1989 | Boumans et al. | 99/287 |
| 4,967,647 | 11/1990 | King | 99/280 |
| 5,083,504 | 1/1992 | Koga et al. | 99/302 R |
| 5,297,472 | 3/1994 | Suzuki et al. | 99/289 T |
| 5,353,692 | 10/1994 | Reese et al. | 99/289 T |

OTHER PUBLICATIONS

Stan McLean, VKI Technologies; Mechanical Desktop application; Zuma Brewer; World Wide Web, www.autodesk.com/prodsol/mech/spotlite/zuma3.htm, Jan. 12, 1998.

*Primary Examiner*—Reginald L. Alexander
*Attorney, Agent, or Firm*—Samuels, Gauthier & Stevens

[57] ABSTRACT

An apparatus for consecutively dispensing an equal volume of a liquid from a storage tank. The system includes a hermetically sealed metering chamber at least partially submerged beneath a standing level of liquid contained in a storage tank. The metering chamber has an inlet port communicating with the interior of the tank. A one-way valve accommodates an inflow of liquid into the metering chamber from the tank via the inlet port, and blocks an outflow of liquid from the chamber to the tank. A discharge conduit protrudes into the interior of the chamber. A pump pneumatically pressurizes the metering chamber to exhaust a predetermined volume of liquid via the discharge conduit.

6 Claims, 5 Drawing Sheets

APPARATUS FOR CONSECUTIVELY DISPENSING AN EQUAL VOLUME OF LIQUID

CROSS REFERENCE TO RELATED APPLICATIONS

This application contains subject matter that relates to the following applications filed evendate herewith, identified as serial number TBD entitled "Automated Beverage Brewing System" and serial number TBD entitled "Beverage Filter Cartridge Holder", both hereby incorporated by reference.

BACKGROUND OF THE INVENTION

1. Field of the Invention

This invention relates generally to liquid dispensing systems and is concerned in particular with an improved apparatus for consecutively dispensing an equal volume of liquid from a storage tank.

2. Description of the Prior Art

Many different coffee brewing systems have been designed. Most utilize a pump, such as a peristaltic pump, to transfer water from a reservoir through a conduit to a brewing chamber. The pump is turned on at the beginning of the cycle and at the end of a specific time period the pump is turned off. Others brewing systems use an electrically controlled device to open a valve at the bottom of a reservoir. Through gravity the water travels through a conduit to a brewing chamber. Again at the end of a specific time period, the valve is closed. These prior brewing systems lack the capability of consistently dispensing equal volumes of liquid. The systems are dependent on the accuracy of the timers, the pressure of the liquid, etc.

The objective of the present invention is to provide a liquid dispensing system which consistently dispenses a predetermined volume of liquid from a storage tank.

SUMMARY OF THE INVENTION

In accordance with the present invention, a cyclically operable system consecutively dispenses an equal volume of a liquid from a storage tank. The system includes a hermetically sealed metering chamber at least partially submerged beneath a standing level of liquid contained in a storage tank. The metering chamber has an inlet port communicating with the interior of the tank. A one-way valve accommodates an inflow of liquid into the metering chamber from the tank via the inlet port, and blocks an outflow of liquid from the chamber to the tank. A discharge conduit protrudes into the interior of the chamber. A pump or the like pneumatically pressurizes the metering chamber to thereby exhaust a predetermined volume of liquid via the discharge conduit. The metering chamber is then vented to accommodate an inflow of an equal volume of liquid via the inlet port.

BRIEF DESCRIPTION OF THE DRAWINGS

Other objects, features and advantages of the present invention will become apparent in light of the following detailed description in connection with the accompanying drawings, wherein.

DETAILED DESCRIPTION OF PREFERRED EMBODIMENT

Figure 1:
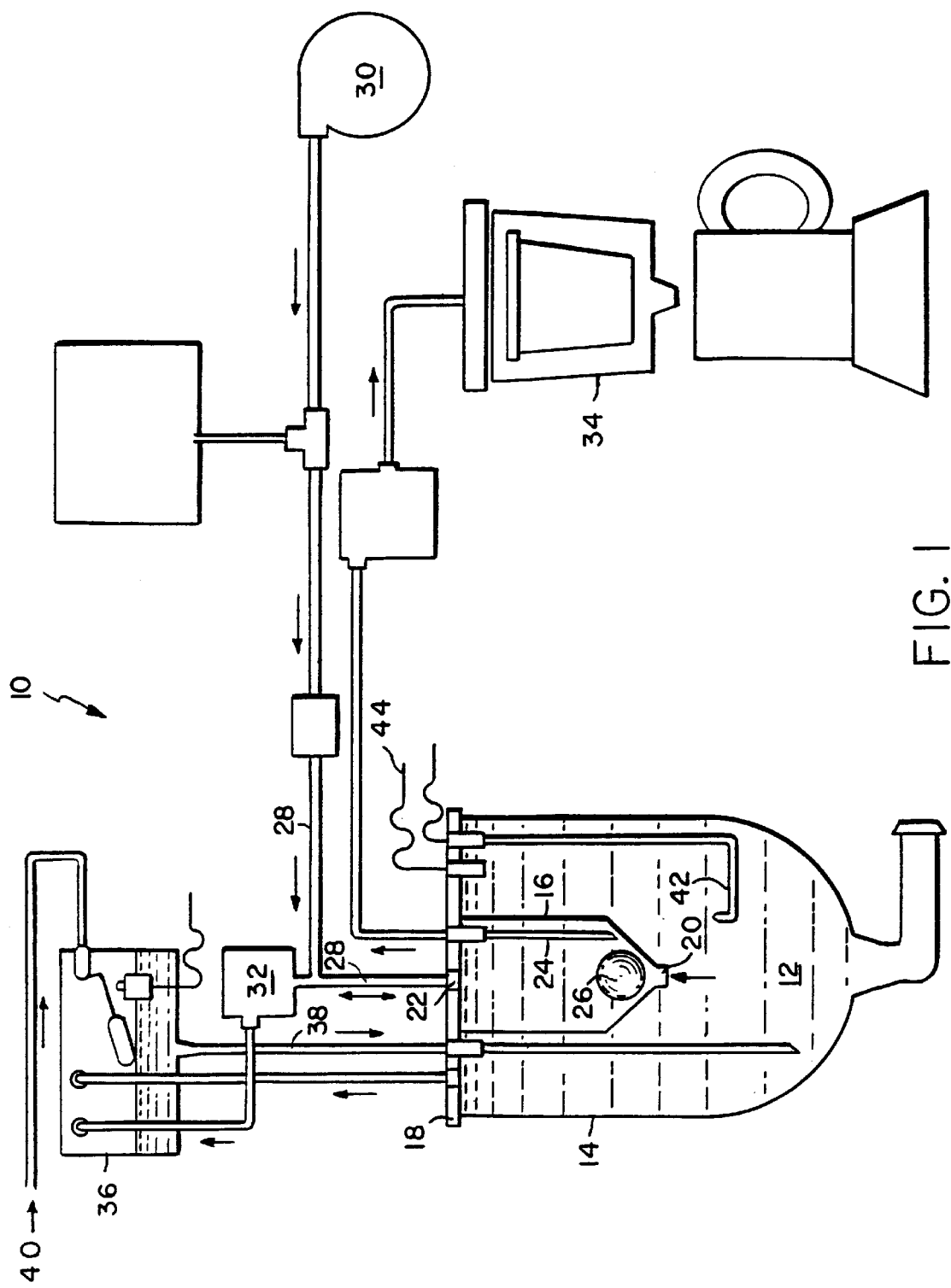
FIG. 1 is a diagrammatic illustration of a brewing system in accordance with the present invention.

The present invention is specially adapted for use in, although not limited in application to, a brewing system of the type generally indicated at 10 in FIG. 1. Here, the dispensed liquid is water heated to a predetermined elevated temperature to brew beverages from extracts contained in disposable hermetically sealed cartridges. The brewing system consistently dispenses equal volumes of water 12 from a storage tank 14. A small metering chamber 16 is the primary dispensing component. The metering chamber 16 is at least partially submerged beneath the standing level of water 12 in the tank 14. A cover 18 overlies and hermetically seals both the tank and the metering chamber.

Figure 2:
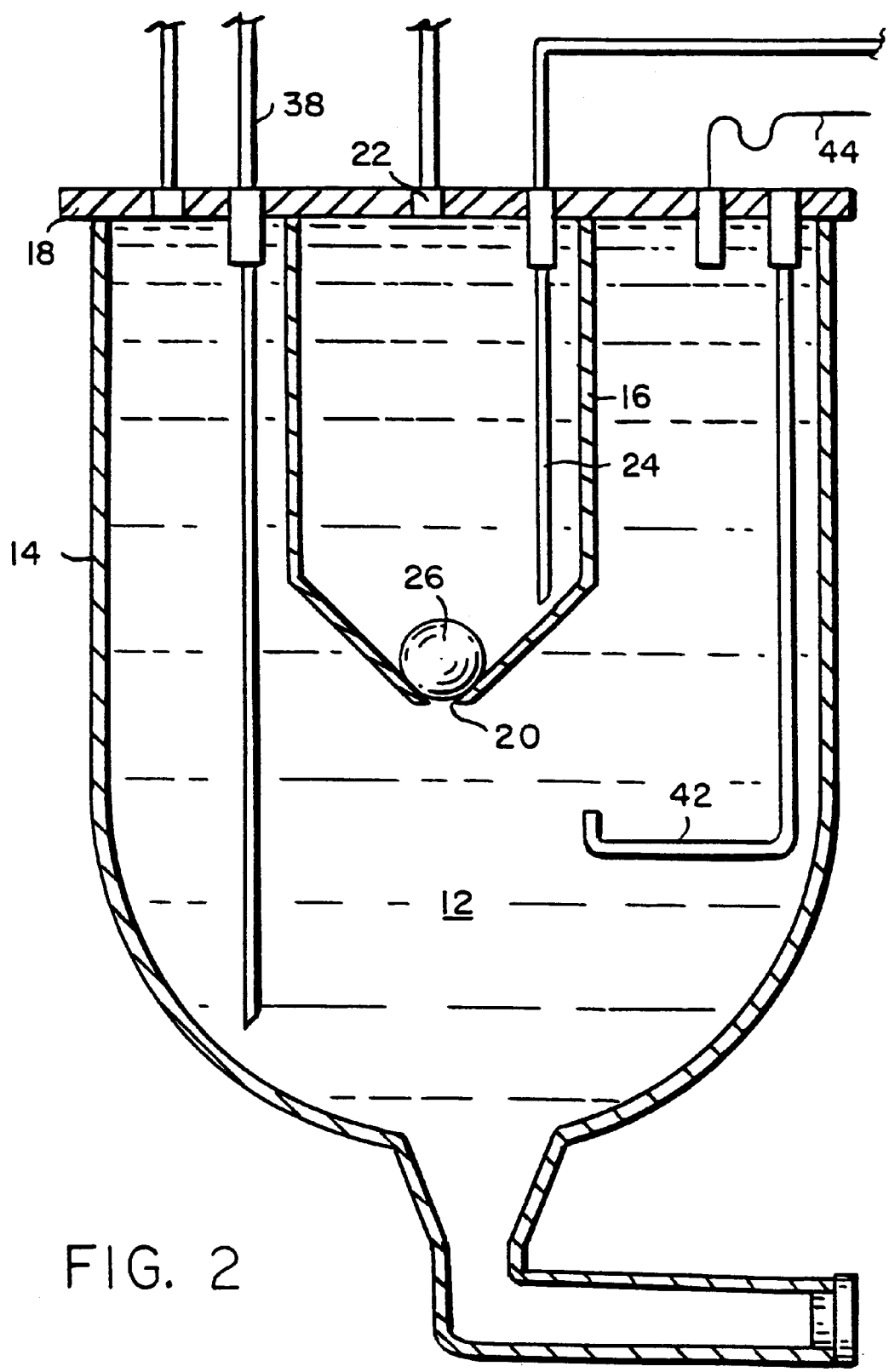
FIG. 2 is a partial view, on an enlarged scale, of the storage tank and associated metering chamber shown in FIG. 1, with both being filled with liquid.
Figure 3:
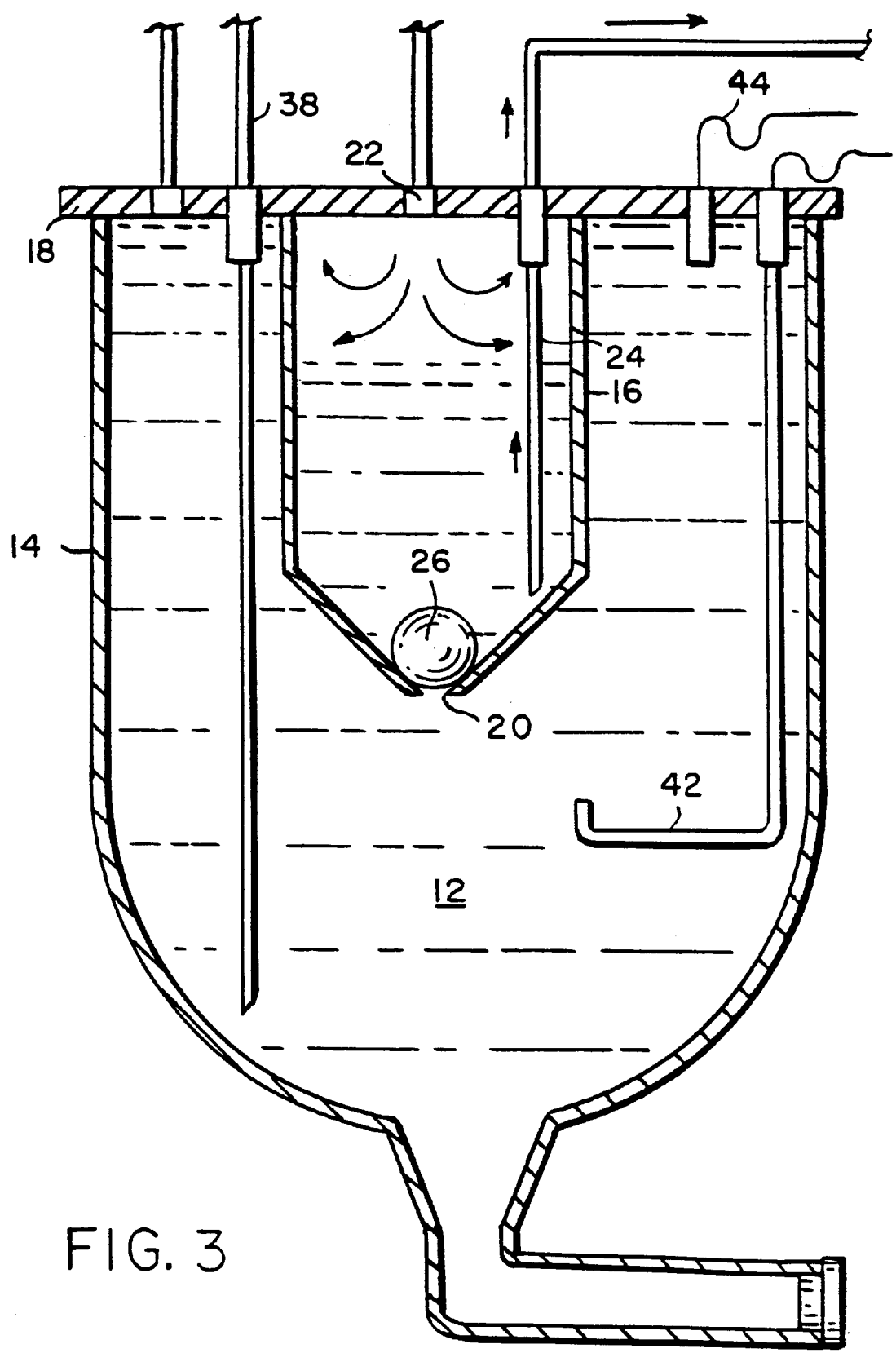
FIG. 3 is a view similar to FIG. 2 showing the apparatus in a discharge mode.
Figure 4:
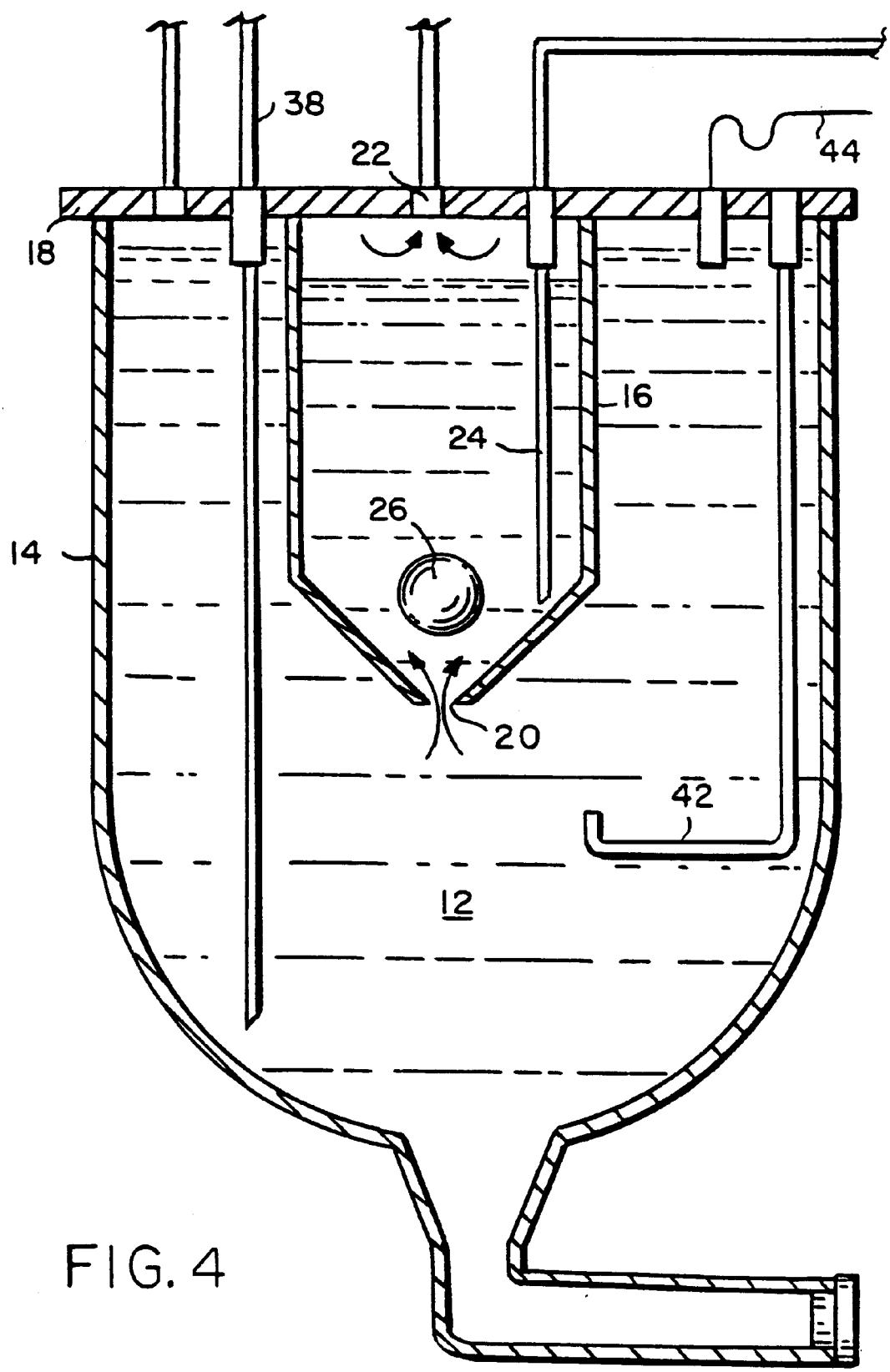
FIG. 4 is another view similar to FIG. 2 showing the apparatus in a refilling mode.

With reference additionally to FIGS. 2–4, it will be seen that the metering chamber 16 has an inlet port 20 on the bottom thereof to accommodate water inflow from the tank 14, a pneumatic port 22, and a third port which accommodates penetration into the metering chamber of a discharge conduit 24 to a depth "d". A one way valve accommodates an inflow of water 12 from the tank 14 into the metering chamber 16 through the inlet port 20. In the preferred embodiment herein chosen for purposes of disclosure, the one way valve comprises a silicone ball 26 gravitationally seated in a closed position blocking outflow of liquid from the metering chamber via the inlet port. As will hereinafter be explained, the ball 26 adapted to be hydraulically dislodged from the inlet opening by an inflow of liquid from the storage tank.

In the dwell state illustrated in FIG. 2, the metering chamber 16 is filled with water, and the ball 26 is gravitationally seated in its closed position blocking any outflow of water from the metering chamber back into the storage tank.

Again with reference to FIG. 1, it will be seen that the pneumatic port 22 is connected via conduit 28 to an air pump 30 and to a vent valve 32. When the valve 32 is closed, pressurized air delivered by pump 30 will be admitted into the metering chamber 16 via the pneumatic port 22.

The dispensing cycle of the apparatus is disclosed in FIG. 3. With the vent valve 32 closed and the pump 30 operating, pressurized air is delivered to the metering chamber to pneumatically elevate its interior pressure, thereby discharging liquid via discharge conduit 24 for delivery to a brewing chamber 34. Liquid discharge will continue until the level of liquid in the metering chamber drops below the depth "d" of penetration of the discharge conduit 24. Throughout the dispensing cycle, the elevated internal pressure urges the ball 26 firmly downwardly into its closed position blocking outflow of liquid via the inlet opening 20.

At the conclusion of the dispensing cycle, the pump 30 is shut down and the vent valve 32 is opened. The open vent valve 32 allows the air in the metering chamber 16 to escape as shown in FIG. 4. Concurrently the water 12 in the tank 14 hydraulically dislodges the silicone ball 26 from its seat, allowing the water from the tank 14 to refill the metering chamber 16 through the inlet port 20. Once the metering chamber 16 is refilled, the vent valve 32 is closed, allowing gravity to return the silicone ball 26 to its closed position as depicted in FIG. 2. Water from a cold water reservoir 36 flows into the tank 14 through conduit 38 to replace the water which flows into the metering chamber 16. The cold water reservoir 36 has an associated water inlet valve 40 to keep the reservoir filled.

The water in the tank 14 is typically heated by a submerged heating element 42. A thermistor 44 may be used to monitor water temperature and to control operation of the heating element 42.

Figure 5:
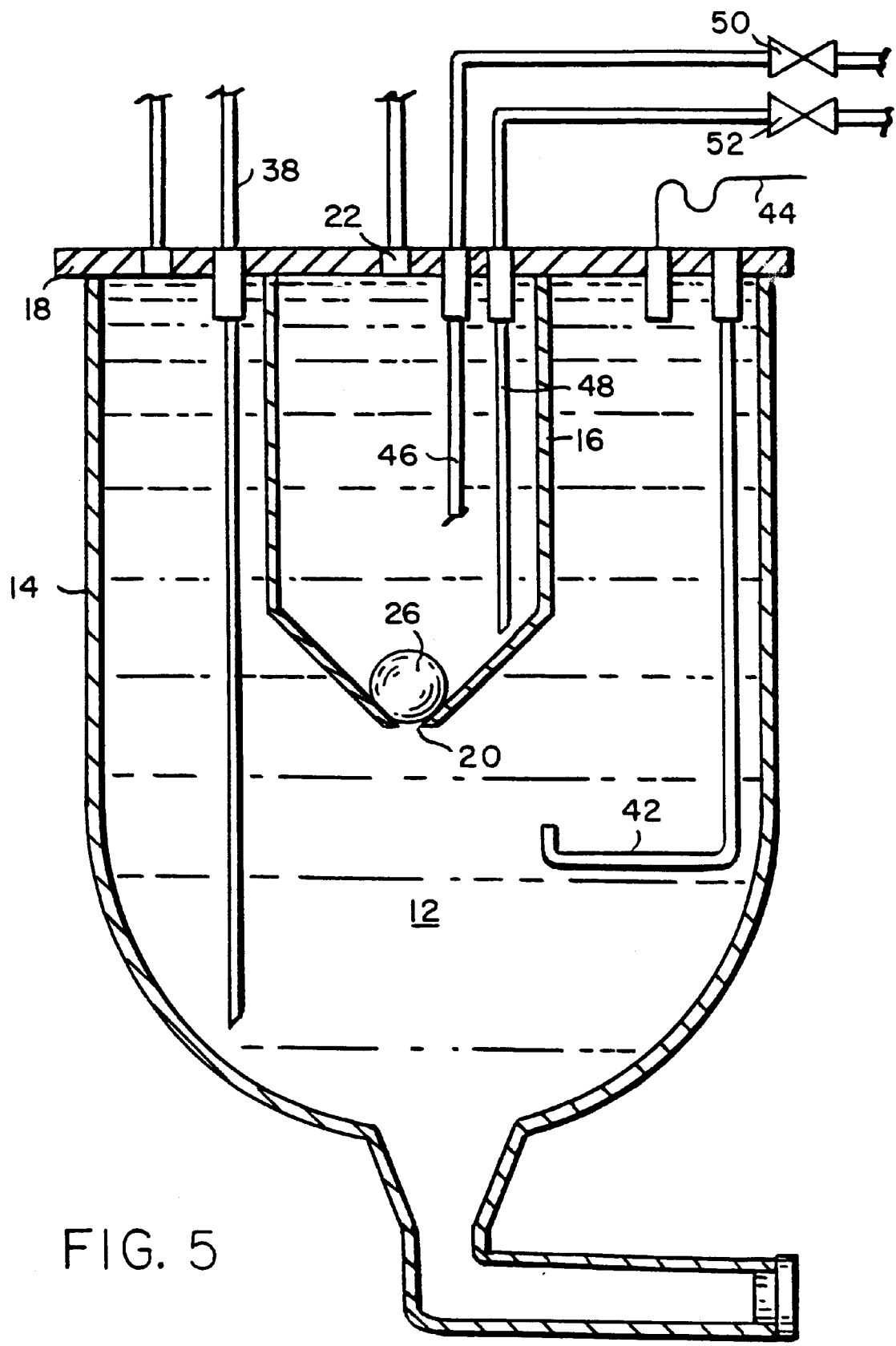
FIG. 5 is a view showing an alternative embodiment of the invention.

Alternatively the metering chamber 16 may be used to dispense more than one volume of water. As shown in FIG. 5, separate discharge conduits 46, 48 may be provided, each penetrating to a different depth in the metering chamber 16. Valves 50, 52 in the discharge conduits 46, 48 will control which conduit is employed in a particular dispensing cycle. Additional discharge conduits may be added as desired.

The foregoing description has been limited to a specific embodiment of the invention. It will be apparent, however, that variations and modifications can be made to the invention, with the attainment of some or all of the advantages. For example the metering chamber 16 may be utilized to dispense water for purposes other than brewing coffee or the silicone ball may be replaced with a flap or conic valve. It is the object of the claims to cover all such variations and modifications as come within the true spirit and scope of the invention.

What is now claimed is:

1. Apparatus for consecutively dispensing an equal volume of a liquid from a storage tank, said apparatus comprising:

a hermetically sealed metering chamber at least partially submerged beneath the standing level of liquid in said tank, said metering chamber having an inlet port communicating with the interior of said tank beneath said level;

one-way valve means for accommodating an inflow liquid into said metering chamber from said tank via said inlet port, and for blocking an outflow of liquid from said chamber via said inlet port into said tank;

a plurality of discharge conduits communicating with the interior of said metering chamber, said discharge conduits having varying penetration depths beneath the level of liquid contained in said metering chamber;

valve means for selectively opening any one of said discharge conduits and for closing the other of said discharge conduits;

means for pneumatically elevating the pressure in said metering chamber to thereby discharge liquid contained therein via said open discharge conduit, the volume of the thus discharged liquid being a function of the penetration depth of said open discharge conduit; and vent means for relieving said pressure to thereby replenish the thus discharged liquid with an inflow of liquid from said tank via said inlet port.

2. The apparatus as claimed in claim 1 wherein said one way valve means comprises a valve element gravitationally seated in a closed position blocking said inlet port, said valve element being hydraulically dislodged from said closed position to an open position by an inflow of liquid from said tank via said inlet port into said chamber.

3. The apparatus as claimed in claim 1 wherein said valve element is a sphere.

4. The apparatus as claimed in claim 1 wherein said means for elevating the pressure in said chamber comprises a supply conduit leading from a source of pressurized air to the interior of said chamber.

5. The apparatus as claimed in claim 4 wherein said supply conduit communicates with the interior of said chamber at a level above that of said discharge conduit.

6. The apparatus as claimed in claim 1 further comprising means for resupplying said tank with the liquid being admitted into said chamber.

* * * * *

UNITED STATES PATENT AND TRADEMARK OFFICE
CERTIFICATE OF CORRECTION

PATENT NO. : 6,082,247
DATED : July 4, 2000
INVENTOR(S) : Roderick H. Beaulieu, John E. Sylvan It is certified that error appears in the above-identified patent and that said Letters Patent is hereby corrected as shown below:

<u>ON THE TITLE PAGE</u>

Item [75] Inventor, please add --John E. Sylvan, Newton, MA --;
"Roderick H. Beaulicu" should read --Roderick H. Bealieu--.

Signed and Sealed this

Twenty-ninth Day of May, 2001

Attest:

NICHOLAS P. GODICI

*Attesting Officer*   *Acting Director of the United States Patent and Trademark Office*

UNITED STATES PATENT AND TRADEMARK OFFICE
CERTIFICATE OF CORRECTION

PATENT NO. : 6,082,247  
DATED : July 4, 2000  
INVENTOR(S) : Roderick H. Beaulieu, John E. Sylvan Page 1 of 1

It is certified that error appears in the above-identified patent and that said Letters Patent is hereby corrected as shown below:

Title page,
Item [75] Inventor, please add -- John E. Sylvan, Newton, MA --;
Roderick H. Beaulicu" should read -- Roderick H. Beaulieu --.

This Certificate supersedes Certificate of Correction issued May 29, 2001

Signed and Sealed this

Twenty-fifth Day of December, 2001

Attest:

JAMES E. ROGAN
*Director of the United States Patent and Trademark Office*

*Attesting Officer*